US011791965B2

(12) United States Patent
Kubota et al.

(10) Patent No.: US 11,791,965 B2
(45) Date of Patent: Oct. 17, 2023

(54) SYSTEM INFORMATION ACQUISITION OVER BANDWIDTH PARTS

(71) Applicant: QUALCOMM INCORPORATED, San Diego, CA (US)

(72) Inventors: Keiichi Kubota, Tokyo (JP); Peng Cheng, Beijing (CN); Masato Kitazoe, Hachiouji (JP); Peter Pui Lok Ang, San Diego, CA (US); Tao Luo, San Diego, CA (US); Heechoon Lee, San Diego, CA (US); Hung Dinh Ly, San Diego, CA (US); Prashanth Haridas Hande, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 60 days.

(21) Appl. No.: 16/964,100

(22) PCT Filed: Jan. 15, 2019

(86) PCT No.: PCT/CN2019/071760
§ 371 (c)(1),
(2) Date: Jul. 22, 2020

(87) PCT Pub. No.: WO2019/157896
PCT Pub. Date: Aug. 22, 2019

(65) Prior Publication Data
US 2021/0044408 A1      Feb. 11, 2021

Related U.S. Application Data

(63) Continuation of application No. PCT/CN2018/076916, filed on Feb. 16, 2018.

(51) Int. Cl.
*H04L 5/00* (2006.01)
*H04W 76/27* (2018.01)
(Continued)

(52) U.S. Cl.
CPC ........... *H04L 5/0053* (2013.01); *H04W 48/12* (2013.01); *H04W 48/14* (2013.01); *H04W 72/21* (2023.01); *H04W 72/23* (2023.01); *H04W 76/27* (2018.02)

(58) Field of Classification Search
CPC ................................... H04L 5/0032
See application file for complete search history.

(56) References Cited

U.S. PATENT DOCUMENTS 9,019,902 B2    4/2015 Damnjanovic et al.
2013/0064119 A1    3/2013 Montojo et al.
(Continued)

FOREIGN PATENT DOCUMENTS

WO    2010056763    5/2010
WO    2018028347 A1    2/2018

OTHER PUBLICATIONS

International Search Report and Written Opinion—PCT/CN2018/076916—ISA/EPO—dated Nov. 16, 2018.
(Continued)

*Primary Examiner* — Charles C Jiang
*Assistant Examiner* — Debebe A Asefa
(74) *Attorney, Agent, or Firm* — Patterson & Sheridan, L.L.P.

(57) ABSTRACT

Certain aspects of the present disclosure relate to communication systems, and more particularly, to system information acquisition over bandwidth parts (BWPs) in communications system operating according to new radio (NR) technologies. In an exemplary method, a user equipment (UE) receives system information (SI) via a transmission in a downlink (DL) bandwidth part (BWP) of a system bandwidth and transmits, to a serving base station (BS) and in response to receiving the SI, an indication that the UE has completed SI acquisition.

22 Claims, 13 Drawing Sheets

(51) Int. Cl.
  *H04W 48/12* (2009.01)
  *H04W 48/14* (2009.01)
  *H04W 72/21* (2023.01)
  *H04W 72/23* (2023.01)

(56) References Cited

U.S. PATENT DOCUMENTS

| | | | |
|---|---|---|---|
| 2016/0183167 A1 | 6/2016 | Agiwal et al. | |
| 2016/0234735 A1 | 8/2016 | Kubota et al. | |
| 2016/0352493 A1 | 12/2016 | Tan et al. | |
| 2017/0171797 A1 | 6/2017 | Nigam et al. | |
| 2017/0251500 A1 | 8/2017 | Agiwal et al. | |
| 2018/0183551 A1* | 6/2018 | Chou | H04W 72/1268 |
| 2019/0150064 A1* | 5/2019 | Chen | H04W 48/10 370/328 |
| 2021/0044408 A1* | 2/2021 | Kubota | H04W 48/12 |
| 2021/0235475 A1* | 7/2021 | Ingale | H04W 72/1257 |

OTHER PUBLICATIONS

International Search Report and Written Opinion—PCT/CN2019/071760—ISA/EPO—dated Apr. 16, 2019.
Huawei, et al., "SI Reception for Connected UE in BWP", 3GPP Draft, 3GPP TSG-RAN2 Meeting #AH-1801, R2-1801194, SI Reception for Connected UE in BWP, 3rd Generation Partnership Project (3GPP), Mobile Competence Centre, 650, Route Des Lucioles, F-06921 Sophia-Antipolis Cedex, France, vol. RAN WG2, No. Vancouver, Canada, Jan. 22, 2018-Jan. 26, 2018, Jan. 12, 2018 (Jan. 12, 2018), XP051386639, 3 Pages.
ITRI: "Connected Mode UE Behaviour on Receiving Paging Message for SI Change Notification", 3GPP Draft, 3GPP TSG-RAN WG2 Meeting #101, R2-1802158, BWP SI Change V1, 3rd Generation Partnership Project (3GPP), Mobile Competence Centre, 650, Route Des Lucioles, F-06921 Sophia-Antipolis Cedex, France, vol. RAN WG2, No. Athens, Greece, Feb. 26, 2018-Mar. 2, 2018, Feb. 14, 2018 (Feb. 14, 2018), XP051399153, 3 Pages.
SAMSUNG: "Dedicated Signalling of SI Upon UE Mobility", 3GPP Draft, 3GPP TSG-RAN WG2 Meeting #101, 72-1803100, Dedicated Signalling of SI Upon UE Mobility, 3rd Generation Partnership Project (3GPP), Mobile Competence Centre, 650, Route Des Lucioles, F-06921 Sophia-Antipolis Cedex, France, vol. RAN WG2, No. Athens, Greece, Feb. 26, 2018-Mar. 2, 2018, Feb. 15, 2018 (Feb. 15, 2018), XP0513996699, 3 Pages.
Supplementary Partial European Search Report—EP19754577—Search Authority—Munich—dated Nov. 5, 2021.
Catt: "Reception of Updated SI in Connected Mode", 3GPP Draft, 3GPP TSG-RAN WG2 Meeting #101, R2-1801824, 3rd Generation Partnership Project (3GPP), Mobile Competence Centre, 650, Route Des Lucioles, F-06921 Sophia-Antipolis Cedex, France, vol. RAN WG2, No. Athens, Greece, Feb. 26, 2018-Mar. 2, 2018, Feb. 14, 2018 (Feb. 14, 2018), pp. 1-4, XP051399005.
Samsung: "Updated SI Reception in RRC Connected: Bandwidth Part Aspects", 3GPP TSG-RAN2 101, 3GPP Draft, R2-1801881_Updated SI Reception in RRC Connected_Bandwidth Part Aspects, 3rd Generation Partnership Project (3GPP), Mobile Competence Centre, 650, Route Des Lucioles, F-06921 Sophia-Antipolis Cedex, France, vol. RAN WG2, No. Athens, Greece, Feb. 26, 2018-Mar. 2, 2018, Feb. 14, 2018 (Feb. 14, 2018), 3 Pages, XP051399021.
Supplementary European Search Report—EP19754577—Search Authority—Munich—dated Mar. 25, 2022.

* cited by examiner

SYSTEM INFORMATION ACQUISITION OVER BANDWIDTH PARTS

This application for Patent is a national stage application under 35 U.S.C. § 371 of PCT/CN2019/071760, filed Jan. 15, 2019, which claims priority to International Patent Cooperation Treaty Application No. PCT/CN2018/076916, filed Feb. 16, 2018, which are both assigned to the assignee of the present application and are expressly incorporated by reference herein in their entireties.

FIELD

The present disclosure relates generally to wireless communication systems, and more particularly, to system information acquisition in communications system using bandwidth parts (BWPs).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an evolved Node B (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio BS (NR NB), a network node, 5G NB, eNB, a Next Generation NB (gNB), etc.). A BS or DU may communicate with a set of UEs on downlink channels (e.g., for transmissions from a BS or to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

As the demand for mobile broadband access continues to increase, there exists a need for further improvements in wireless communications technology. These improvements may be applicable to various multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a user equipment (UE). The method generally includes receiving system information (SI) via a transmission in a first downlink (DL) bandwidth part (BWP) of a system bandwidth and transmitting, to a serving base station (BS) and in response to receiving the SI, an indication that the UE has completed SI acquisition.

Certain aspects provide a method for wireless communication by a base station (BS). The method generally includes transmitting system information (SI) to a user equipment (UE) via a first downlink (DL) bandwidth part (BWP) of a system bandwidth and receiving from the UE an indication that the UE has completed SI acquisition subsequent to transmitting the SI.

Certain aspects provide a method for wireless communication by a base station (BS). The method generally includes configuring an active downlink (DL) bandwidth part (BWP), of a system bandwidth of a cell served by the BS, for transmitting data to a user equipment (UE), paging the UE via the active DL BWP in response to updating first system information (SI) of the cell, and transmitting the updated first SI to the UE via an initial DL BWP, different from the active DL BWP, of the system bandwidth.

Certain aspects provide a method for wireless communication by a user equipment (UE). The method generally includes receiving a page from a base station (BS) via an active downlink (DL) bandwidth part (BWP) of a system bandwidth, switching a receiver of the UE to receive via an initial DL BWP of the system bandwidth in response to receiving the page, receiving updated system information (SI) from the BS via the initial DL BWP subsequent to switching the receiver to receive via the initial DL BWP, and switching the receiver of the UE to receive via the active DL BWP in response to receiving the updated SI.

Certain aspects provide an apparatus for wireless communication. The apparatus generally includes a processor configured to receive system information (SI) via a transmission in a first downlink (DL) bandwidth part (BWP) of a system bandwidth and to transmit, to a serving base station (BS) and in response to receiving the SI, an indication that the apparatus has completed SI acquisition, and a memory coupled with the processor.

Certain aspects provide an apparatus for wireless communication. The apparatus generally includes a processor configured to transmit system information (SI) to a user equipment (UE) via a first downlink (DL) bandwidth part (BWP) of a system bandwidth and to receive from the UE an indication that the UE has completed SI acquisition subsequent to transmitting the SI, and a memory coupled with the processor.

Certain aspects provide an apparatus for wireless communication. The apparatus generally includes a processor configured to configure an active downlink (DL) bandwidth part (BWP), of a system bandwidth of a cell served by the apparatus, for transmitting data to a user equipment (UE), to page the UE via the active DL BWP in response to updating first system information (SI) of the cell, and to transmit the updated first SI to the UE via an initial DL BWP, different from the active DL BWP, of the system bandwidth, and a memory coupled with the processor.

Certain aspects provide an apparatus for wireless communication. The apparatus generally includes a processor configured to receive a page from a base station (BS) via an active downlink (DL) bandwidth part (BWP) of a system bandwidth, to switch a receiver of the apparatus to receive via an initial DL BWP of the system bandwidth in response to receiving the page, to receive updated system information (SI) from the BS via the initial DL BWP subsequent to switching the receiver to receive via the initial DL BWP, and to switch the receiver of the apparatus to receive via the active DL BWP in response to receiving the updated SI, and a memory coupled with the processor.

Certain aspects provide an apparatus for wireless communication. The apparatus generally includes means for receiving system information (SI) via a transmission in a first downlink (DL) bandwidth part (BWP) of a system bandwidth and means for transmitting, to a serving base station (BS) and in response to receiving the SI, an indication that the apparatus has completed SI acquisition.

Certain aspects provide an apparatus for wireless communication. The apparatus generally includes means for transmitting system information (SI) to a user equipment (UE) via a first downlink (DL) bandwidth part (BWP) of a system bandwidth and means for receiving from the UE an indication that the UE has completed SI acquisition subsequent to transmitting the SI.

Certain aspects provide an apparatus for wireless communication. The apparatus generally includes means for configuring an active downlink (DL) bandwidth part (BWP), of a system bandwidth of a cell served by the apparatus, for transmitting data to a user equipment, means for paging the UE via the active DL BWP in response to updating first system information (SI) of the cell, and means for transmitting the updated first SI to the UE via an initial DL BWP, different from the active DL BWP, of the system bandwidth.

Certain aspects provide an apparatus for wireless communication. The apparatus generally includes means for receiving a page from a base station (BS) via an active downlink (DL) bandwidth part (BWP) of a system bandwidth, means for switching a receiver of the apparatus to receive via an initial DL BWP of the system bandwidth in response to receiving the page, means for receiving updated system information (SI) from the BS via the initial DL BWP subsequent to switching the receiver to receive via the initial DL BWP, and means for switching the receiver of the apparatus to receive via the active DL BWP in response to receiving the updated SI.

Certain aspects provide computer-readable medium including instructions that, when executed by a processor, cause the processor to perform operations generally including receiving system information (SI) via a transmission in a first downlink (DL) bandwidth part (BWP) of a system bandwidth and transmitting, to a serving base station (BS) and in response to receiving the SI, an indication that an apparatus including the processor has completed SI acquisition.

Certain aspects provide computer-readable medium including instructions that, when executed by a processor, cause the processor to perform operations generally including transmitting system information (SI) to a user equipment (UE) via a first downlink (DL) bandwidth part (BWP) of a system bandwidth and receiving from the UE an indication that the UE has completed SI acquisition subsequent to transmitting the SI.

Certain aspects provide computer-readable medium including instructions that, when executed by a processor, cause the processor to perform operations generally including configuring an active downlink (DL) bandwidth part (BWP), of a system bandwidth of a cell served by an apparatus including the processor, for transmitting data to a user equipment, paging the UE via the active DL BWP in response to updating first system information (SI) of the cell, and transmitting the updated first SI to the UE via an initial DL BWP, different from the active DL BWP, of the system bandwidth.

Certain aspects provide computer-readable medium including instructions that, when executed by a processor, cause the processor to perform operations generally including receiving a page from a base station (BS) via an active downlink (DL) bandwidth part (BWP) of a system bandwidth, switching a receiver of an apparatus including the processor to receive via an initial DL BWP of the system bandwidth in response to receiving the page, receiving updated system information (SI) from the BS via the initial DL BWP subsequent to switching the receiver to receive via the initial DL BWP, and switching the receiver of the apparatus to receive via the active DL BWP in response to receiving the updated SI.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
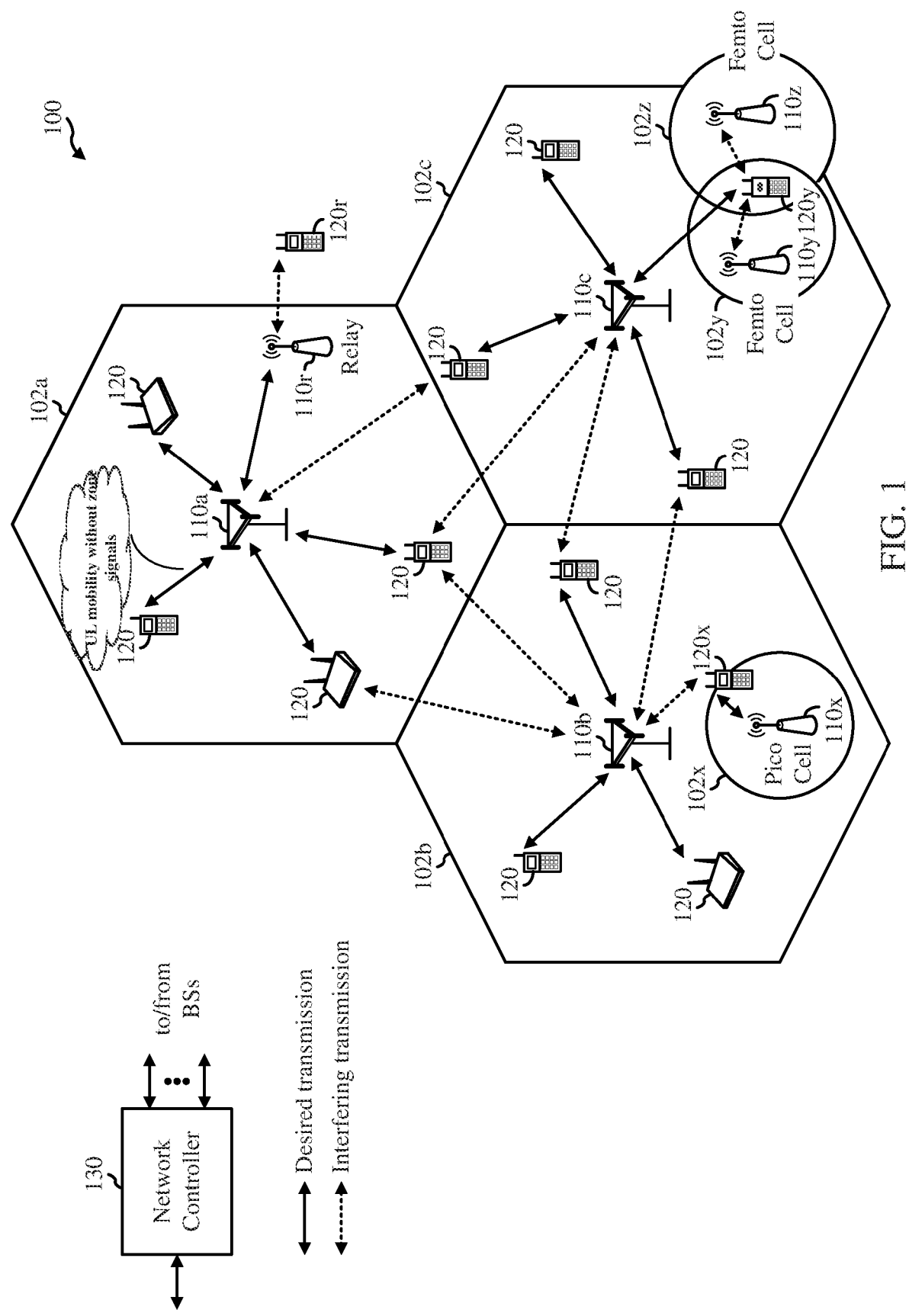
FIG. 1 is a block diagram conceptually illustrating an example telecommunications system, in accordance with certain aspects of the present disclosure.

Aspects of the present disclosure provide apparatus, methods, processing systems, and computer readable mediums for wireless communications systems. At least some aspects may be applicable to new radio (NR) (new radio access technology or 5G technology).

NR may support various wireless communication services, such as Enhanced mobile broadband (eMBB) services targeting wide bandwidth (e.g., 80 MHz and wider) communications, millimeter wave (mmW) services targeting high carrier frequency (e.g., 27 GHz or higher) communications, massive machine type communications (mMTC) services targeting non-backward compatible machine type communications (MTC) techniques, and/or mission critical services targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

Aspects provide techniques and apparatus for a control plane design for BWP in NR. In particular, aspects provide techniques for configuring a UE with a set of BWPs to use for communication, based on a BWP capability of the UE. Using aspects presented herein, a UE may report its BWP capability (e.g., in a UE capability enquiry procedure) to a base station, such as a gNB. The BS may determine a set of BWPs available for the UE to use for communication, based in part on the BWP capability of the UE. The BS may send a (re-)configuration comprising the set of BWPs to the UE. The UE may use the set of BWPs for one or more procedures (e.g., uplink or downlink data communications, radio resource control (RRC) procedures, mobility procedures, paging procedures, etc.) in NR. As described in more detail below, in some aspects, the BS may re-configure the particular set of BWPs for the UE, based on the particular procedure in NR.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed.

As illustrated in FIG. 1, the wireless network 100 may include a number of base stations (BSs) 110 and other network entities. A BS may be a station that communicates with UEs. Each BS 110 may provide communication coverage for a particular geographic area. In 3GPP, the term "cell" can refer to a coverage area of a Node B and/or a NB subsystem serving this coverage area, depending on the context in which the term is used. In NR systems, the term "cell" and evolved NB (eNB), NB, 5G NB, Next Generation NB (gNB), access point (AP). BS, NR BS, 5G BS, or transmission reception point (TRP) may be interchangeable. In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x. 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) or narrowband IoT (NB-IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, subbands, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a resource block (RB)) may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 RBs), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 2 half frames, each half frame consisting of 5 subframes, with a length of 10 ms. Consequently, each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a BS) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

Figure 2:
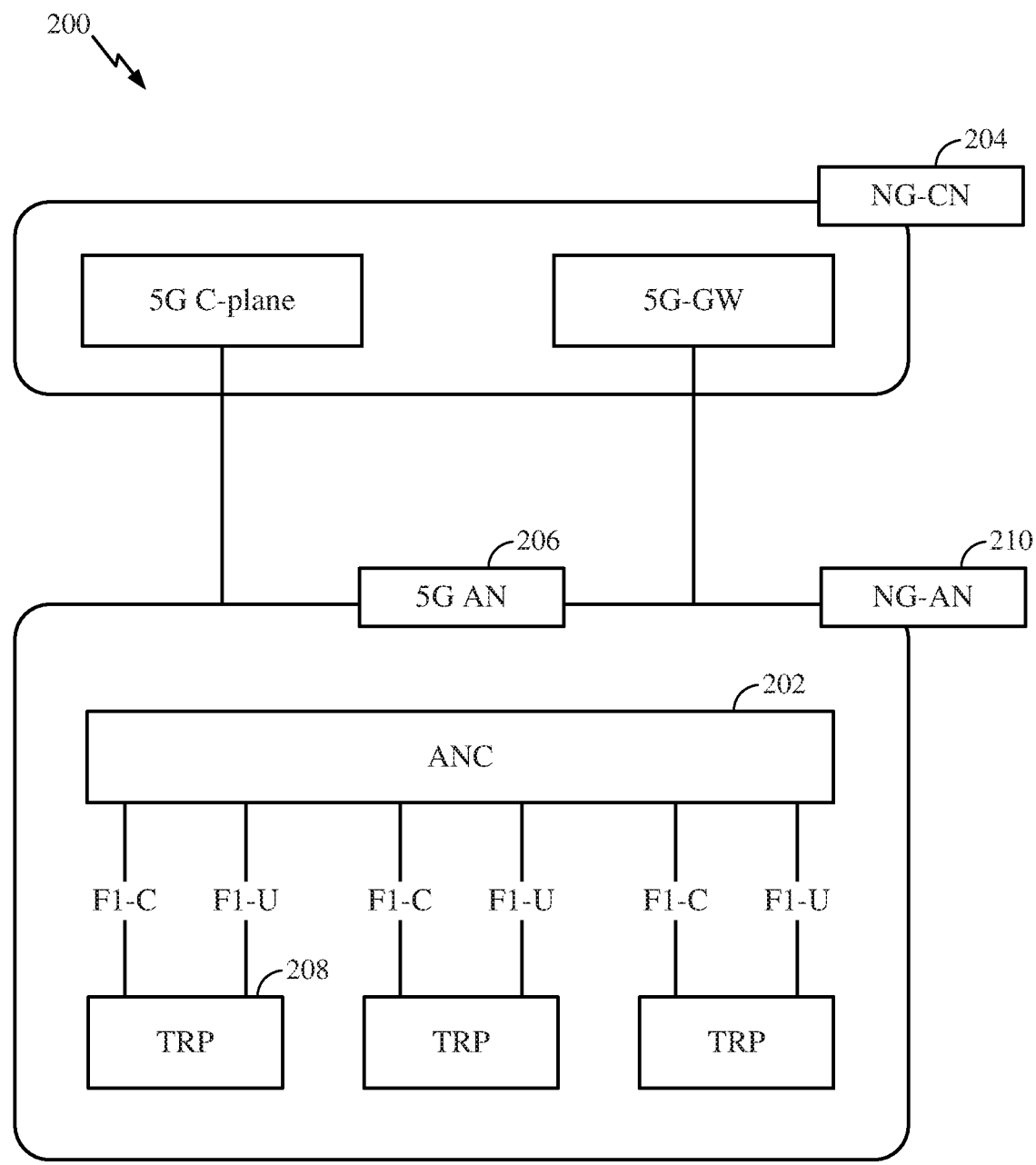
FIG. 2 is a block diagram illustrating an example logical architecture of a distributed radio access network (RAN), in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC 202 may be a central unit (CU) of the distributed RAN 200. The backhaul interface to the next generation core network (NG-CN) 204 may terminate at the ANC 202. The backhaul interface to neighboring next generation access nodes (NG-ANs) 210 may terminate at the ANC 202. The ANC 202 may include one or more TRPs 208. As described above, a TRP may be used interchangeably with "cell".

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP 208 may include one or more antenna ports. The TRPs may be configured to individually (e.g., dynamic selection) or jointly (e.g., joint transmission) serve traffic to a UE.

The logical architecture may support fronthauling solutions across different deployment types. For example, the logical architecture may be based on transmit network capabilities (e.g., bandwidth, latency, and/or jitter). The logical architecture may share features and/or components with LTE. The NG-AN 210 may support dual connectivity with NR. The NG-AN 210 may share a common fronthaul for LTE and NR. The logical architecture may enable cooperation between and among TRPs 208. For example, cooperation may be preset within a TRP and/or across TRPs via the ANC 202. An inter-TRP interface may not be present.

The logical architecture may have a dynamic configuration of split logical functions. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and Physical (PHY) layer may be adaptably placed at the DU or CU (e.g., TRP or ANC, respectively). A BS may include a central unit (CU) (e.g., ANC 202) and/or one or more distributed units (e.g., one or more TRPs 208).

Figure 3:
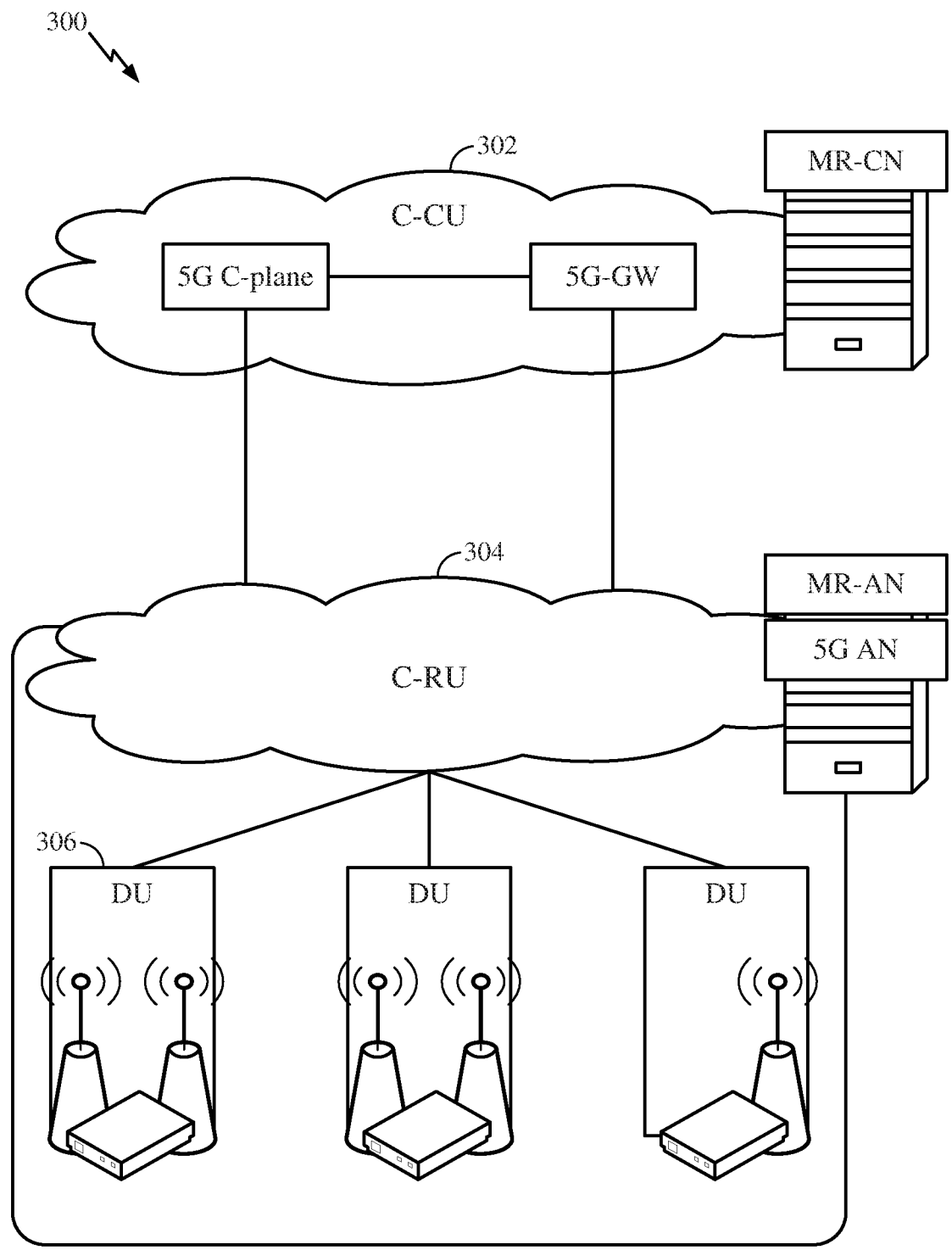
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU 302 may be centrally deployed. C-CU functionality may be offloaded (e.g., to advanced wireless services (AWS)), in an effort to handle peak capacity. A centralized RAN unit (C-RU) 304 may host one or more ANC functions. The C-RU 304 may host core network functions locally. The C-RU 304 may have distributed deployment. The C-RU 304 may be close to the network edge. A DU 306 may host one or more TRPs. The DU 306 may be located at edges of the network with radio frequency (RF) functionality.

Figure 4:
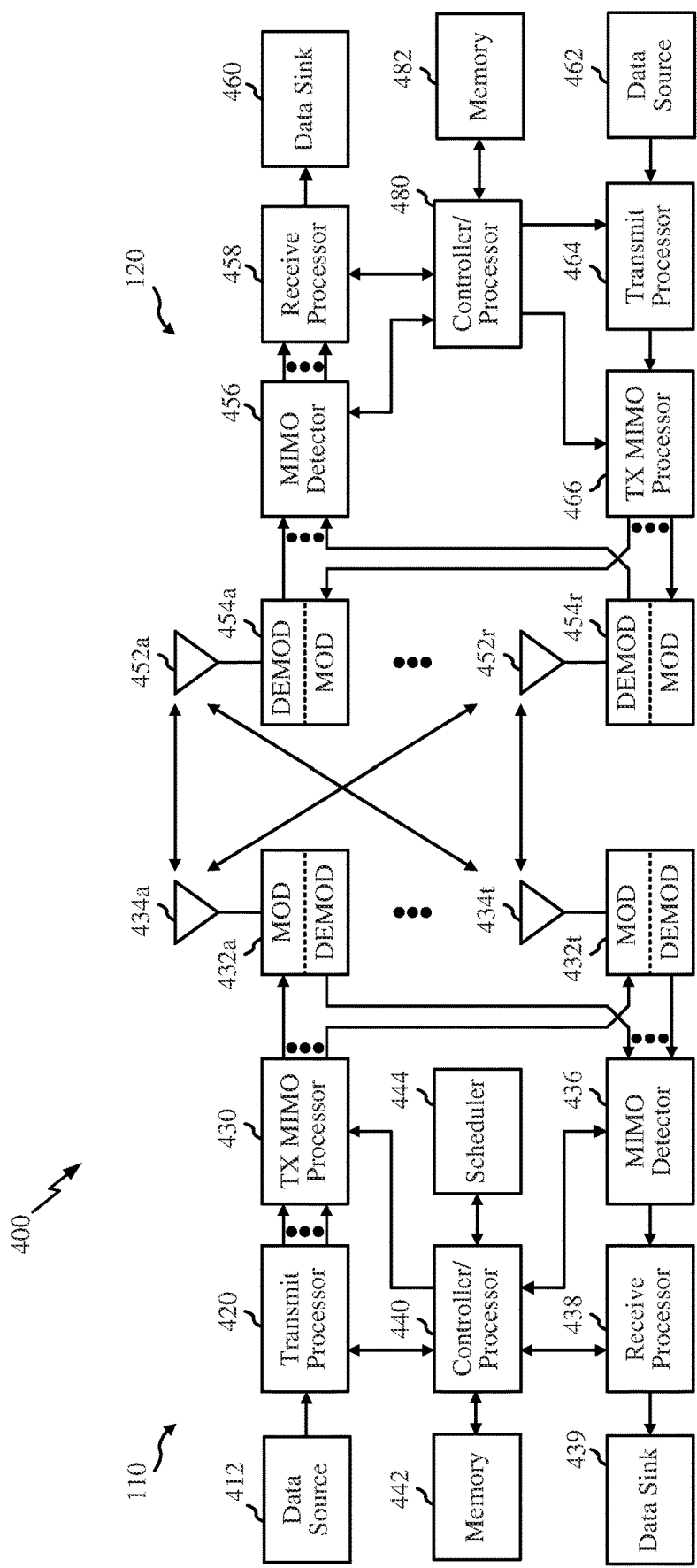
FIG. 4 is a block diagram conceptually illustrating a design of an example base station (BS) and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 430, 420, 438, and/or controller/processor 440 of the BS 110 may be used to perform the operations described herein and illustrated with reference to FIGS. 9-12.

At the BS 110, a transmit processor 420 may receive data from a data source 412 and control information from a controller/processor 440. The control information may be for the Physical Broadcast Channel (PBCH). Physical Control Format Indicator Channel (PCFICH). Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the BS 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 10 and/or other processes for the techniques described herein. The processor 480 and/or other processors and modules at the UE 120 may also perform or direct, e.g., the execution of the functional blocks illustrated in FIG. 9 and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
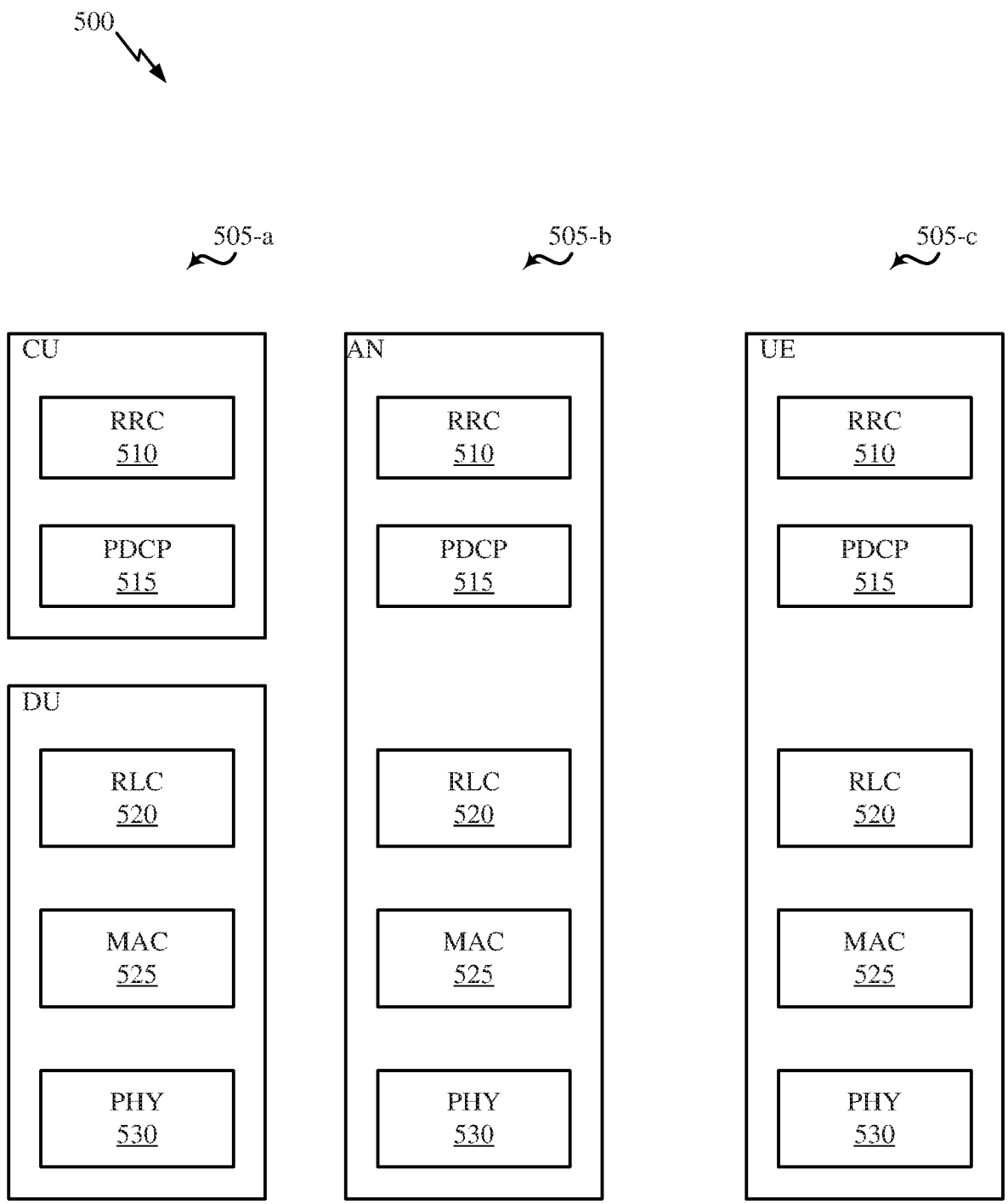
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., C-RU 304 in FIG. 3) and distributed network access device (e.g., DU 306 in FIG. 3). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack 505-c (e.g., the RRC layer 510, the PDCP layer 515, the RLC layer 520, the MAC layer 525, and the PHY layer 530).

Figure 6:
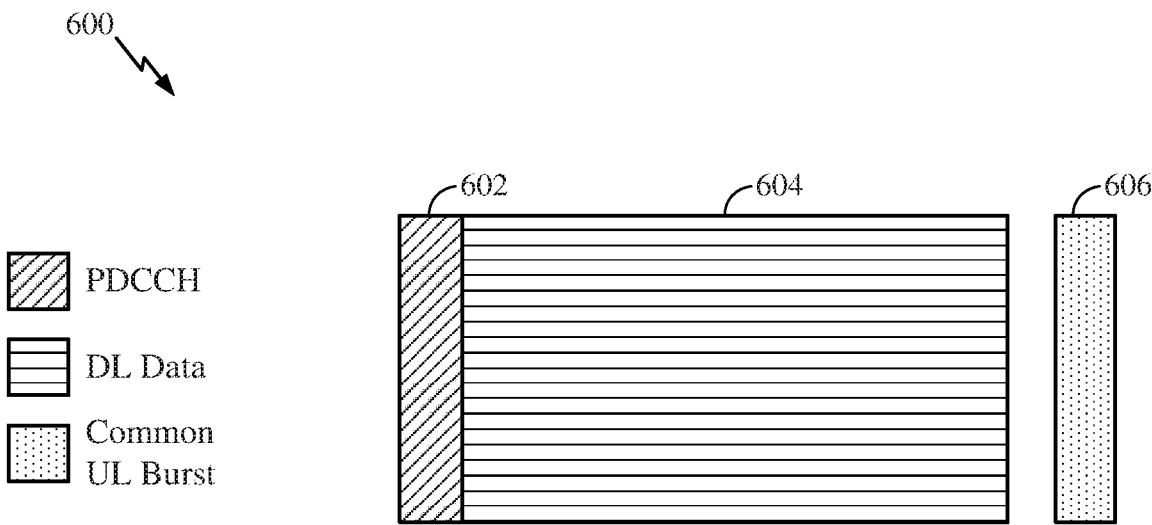
FIG. 6 illustrates an example of a downlink-centric subframe, in accordance with certain aspects of the present disclosure.

FIG. 6 is a diagram showing an example of a DL-centric subframe 600. The DL-centric subframe 600 may include a control portion 602. The control portion 602 may exist in the initial or beginning portion of the DL-centric subframe. The control portion 602 may include various scheduling information and/or control information corresponding to various portions of the DL-centric subframe 600. In some configurations, the control portion 602 may be a physical DL control channel (PDCCH), as indicated in FIG. 6. The DL-centric subframe 600 may also include a DL data portion 604. The DL data portion 604 may be referred to as the payload of the DL-centric subframe 600. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe 600 may also include a common UL portion 606. The common UL portion 606 may sometimes be referred to as an UL burst, a common UL burst, and/or various other suitable terms. The common UL portion 606 may include feedback information corresponding to various other portions of the DL-centric subframe 600. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
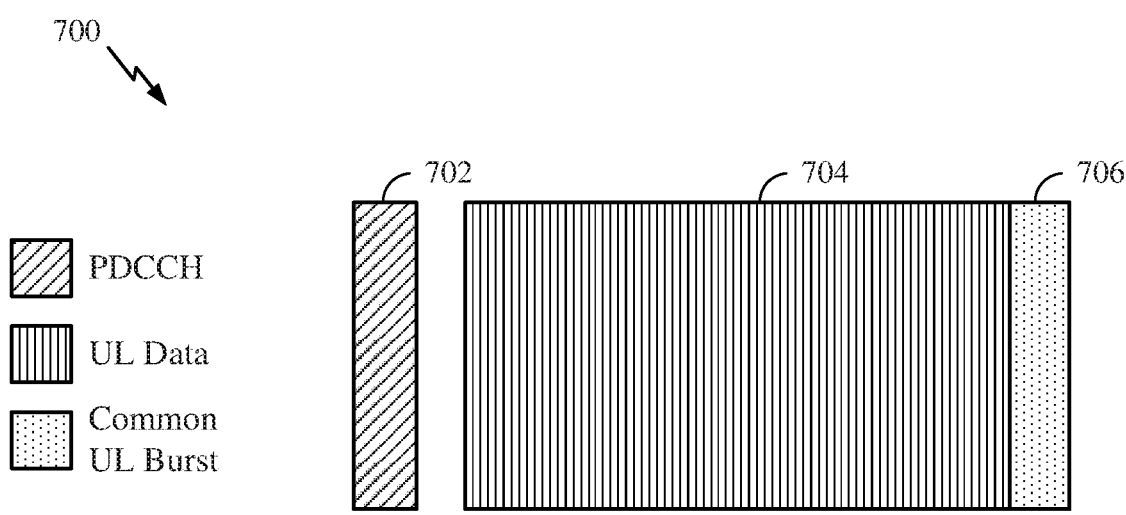
FIG. 7 illustrates an example of an uplink-centric subframe, in accordance with certain aspects of the present disclosure.

FIG. 7 is a diagram showing an example of an UL-centric subframe 700. The UL-centric subframe 700 may include a control portion 702. The control portion 702 may exist in the initial or beginning portion of the UL-centric subframe 700. The control portion 702 in FIG. 7 may be similar to the control portion 602 described above with reference to FIG. 6. The UL-centric subframe 700 may also include an UL data portion 704. The UL data portion 704 may be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a PDCCH.

As illustrated in FIG. 7, the end of the control portion 702 may be separated in time from the beginning of the UL data portion 704. This time separation may be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe 700 may also include a common UL portion 706. The common UL portion 706 in FIG. 7 may be similar to the common UL portion 606 described above with reference to FIG. 6. The common UL portion 706 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Certain wireless communication systems (e.g., such as NR) may support operations (e.g., RRC operations, mobility operations, paging/system information operations, etc.) with one or more different portions of bandwidth (or bandwidth parts (BWPs)) within one or more carriers of the cell. The BWP may be defined by a particular frequency range, center frequency, and/or numerology. Supporting BWPs may enable a communication system (e.g., NR) to support UEs with less receiver bandwidth capability than a whole system bandwidth and/or optimize UE power consumption. For example, in some cases, the maximum bandwidth per carrier (e.g., in NR) may be 400 MHz, where a given UE may have a lower maximum receive bandwidth (e.g., 20 MHz, 100 MHz, etc.).

For a connected UE, one or more multiple UE-specific BWPs can be configured via RRC signaling. In some cases, one or more BWPs can be orthogonal or (partially) overlapped with one or more other BWPs. In addition, NR may support different numerologies, frequency location, and/or bandwidth for each BWP. As used herein, the term numerology generally refers to a set of parameters that define a structure of time and frequency resources used for communication. Such parameters may include, for example, sub-carrier spacing, type of cyclic prefix (e.g., such as normal CP or extended CP), and transmission time intervals (TTIs) (e.g., such as subframe or slot durations).

In Rel-15, a UE may be configured with multiple BWPs (e.g., for each carrier). However, there is generally at most one active downlink (DL) BWP and at most one active uplink (UL) BWP for the UE at a given time for a serving cell. From the UE's perspective, a cell may be associated with a single block of synchronization signal (SS) resources. When in an idle/inactive state, the UE may search for a SS block with remaining minimum system information (RMSI), and may regard the associated BWP of the cell as the initial active BWP. In some cases. NR may enable a single scheduling downlink control information (DCI) to switch the UE's active BWP from one BWP to another BWP (of the same link direction) within a given serving cell.

Figure 8:
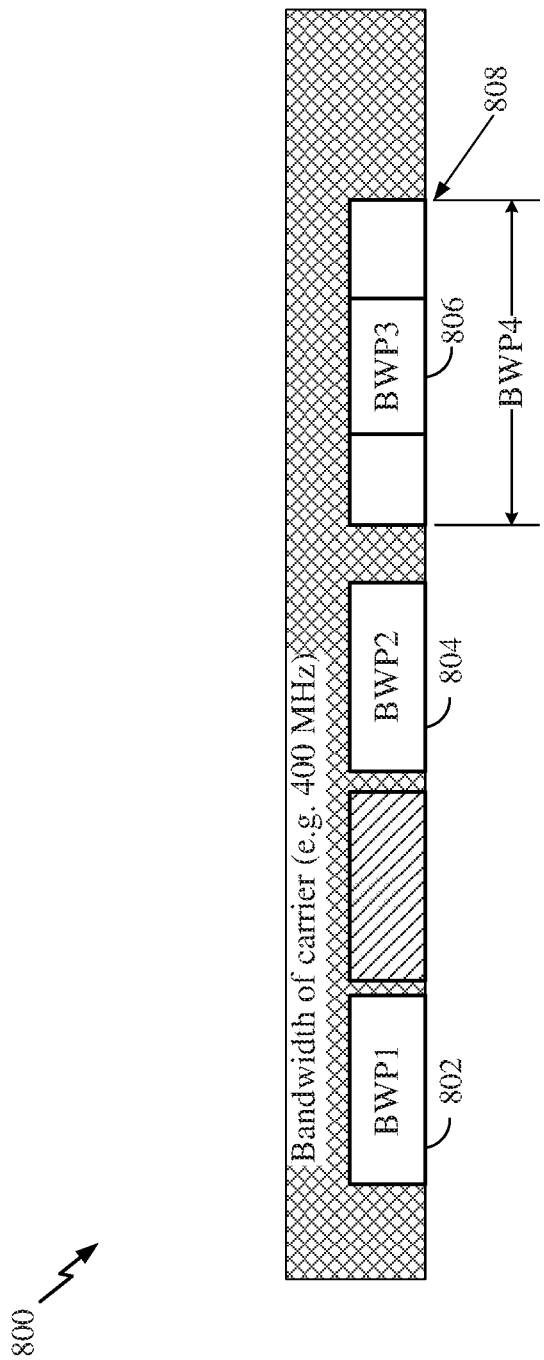
FIG. 8 illustrates an example deployment use scenarios of bandwidth parts in a communication system, in accordance with certain aspects of the present disclosure.

FIG. 8 illustrates example deployment use scenarios of BWPs in a communication system (e.g., Rel-15) having a maximum bandwidth 800, according to certain aspects of the present disclosure. As shown in this example, the maximum bandwidth of the carrier is 400 MHz, and the carrier may be configured with multiple BWPs (e.g., BWPs 802, 804, 806, and 808), each having a bandwidth that is a subset (e.g., 20 MHz. 100 MHz, etc.) of the carrier bandwidth. The carrier bandwidth may also include non-contiguous portions of bandwidth that are available for usage by a BS 110 or UE 120.

In some aspects, the communication system may use BWPs to support a UE's reduced or increased bandwidth capability or efficiently allocate available system resources among multiple UEs 120. As shown in FIG. 8, assuming the UE's receiver bandwidth capability is 100 MHz, the gNB can configure the UE with BWP1 802. In some cases, the gNB can quickly indicate which BWP the UE can use with DCI. In this manner, the gNB can support UEs having a reduced bandwidth capability.

In some aspects, the communication system may also support the use of BWPs with intra-band carrier aggregation (CA). For example, as shown in FIG. 8, a UE can be configured with BWP1802 and BWP2 804, which can be non-contiguous. In some cases, if multiple non-contiguous BWPs are activated at the same time, the BWPs may work jointly with CA. In some cases. CA may be replaced by BWP(s).

In some aspects, the communication system may use BWPs to optimize the UE's power consumption. For example, in some cases, the UE can be configured with two BWPs that have the same center frequency. As shown in FIG. 8, the UE can be configured with a BWP3 806 and a BWP4 808 that have the same center frequency, but where BWP4808 has a wider bandwidth than BWP3 806. In such a configuration, the gNB can configure the UE to use BWP3 to monitor for control channels, and configure the UE to receive data on BWP4. Thus, if the UE wants to receive data, the UE can switch to BWP4 to receive data (e.g., PDSCH).

As used herein, a "system bandwidth" may comprise one or more bandwidth parts, and the system bandwidth is as wide as or wider than a largest bandwidth part of the system bandwidth. Also as used herein, a system bandwidth may comprise one contiguous bandwidth or a plurality of non-contiguous bandwidths.

Example System Information Acquisition Over Bandwidth Parts in New Radio

As described above, certain wireless communication systems (e.g., such as NR compliant systems) may support operations (e.g., RRC operations, mobility operations, paging information operations, system information operations, etc.) with one or more different portions of bandwidth, or bandwidth parts (BWPs), within one or more carriers of a cell. In some wireless communications systems, a common search space is provided by the network in each DL BWP. By providing a common search space in each DL BWP, the network can enable served UEs to get a system information (SI) update notification in a current active DL BWP (also referred to herein as a current DL BWP) via paging. That is, when the network updates SI, the network can page served UEs to notify the UEs that the SI is being updated.

In previously known techniques, a UE may receive a page indicating that SI is being updated, but the UE does not have information regarding which BWP to monitor to receive the updated SI. If the updated SI is not broadcast in a current active DL BWP of the UE, then the UE should retune a receiver to another BWP (i.e., a currently configured DL BWP) in which the updated SI is being broadcast, but the network does not have information regarding when the UE has received all of the updated SI or when the UE will retune the receiver back to the current active DL BWP. Also, for times when a network is transmitting a public warning system (PWS) notification (e.g., an earthquake and tsunami warning system (ETWS) and/or a commercial mobile alert system (CMAS) alert), a BWP switch by a UE to acquire updated SI may not be desirable, due to the need to deliver the PWS notification to the UE as quickly as possible.

According to aspects of the present disclosure, techniques are provided for determining in which BWP a UE should acquire updated SI after the UE gets an SI update notification (e.g., a page as discussed above).

In aspects of the present disclosure, if updated SI is not broadcast in a current active DL BWP (e.g., a DL BWP that the UE is configured to receive), then the UE may retune a radio frequency (RF) receive chain to another BWP on which the network (e.g., a BS) is transmitting the updated SI, acquire the updated SI, and send an indication to the network that the UE has finished acquiring the updated SI. The network may refrain from transmitting other data to the UE until the network has received the indication that the UE has finished acquiring the updated SI. Additionally or alternatively, the network may transmit other data to the UE via the other BWP (on which the network is transmitting the updated SI) before receiving the indication and transmit other data to the UE via the current active DL BWP after receiving the indication.

According to aspects of the present disclosure, a base station may transmit a command in a downlink control information (DCI) to a UE to switch to a second DL BWP subsequent to receiving the SI, and the UE may switch a receiver of the UE to receive via the second DL BWP in response to receiving the command. The UE may then receive further data transmissions, transmitted by the base station, via the second DL BWP. The UE typically will not switch to the second DL BWP without receiving a command from the network to switch to the second DL BWP.

Figure 9:
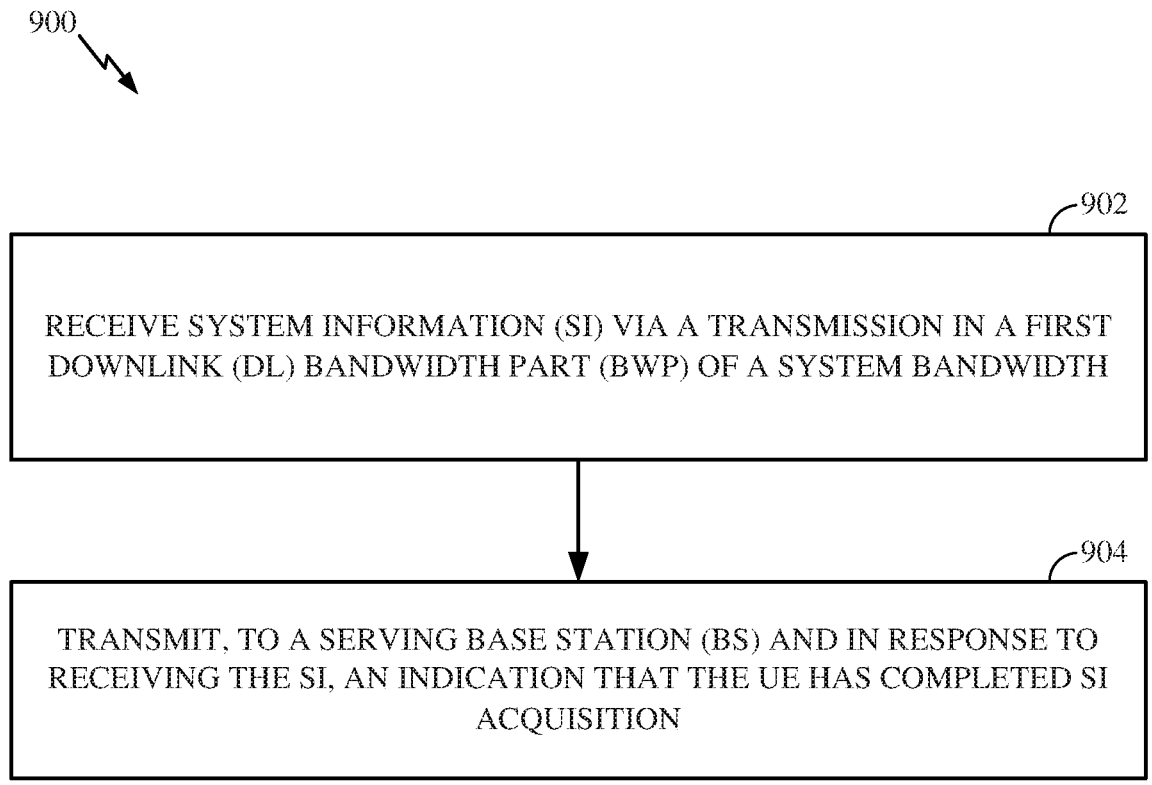
FIG. 9 illustrates example operations for wireless communications performed by a user equipment, in accordance with certain aspects of the present disclosure.

FIG. 9 illustrates example operations 900 for wireless communications, in accordance with aspects of the present disclosure. Operations 900 may be performed, for example, by a UE, such as UE 120 shown in FIG. 1.

Operations 900 begin, at block 902, with the UE receiving system information (SI) via a transmission in a first downlink (DL) bandwidth part (BWP) of a system bandwidth. For example, UE 120, shown in FIG. 1, receives SI from BS 110*a* (see FIG. 1) via a transmission in a first DL BWP (e.g., BWP 802, shown in FIG. 8) of a system bandwidth (e.g., bandwidth 800, shown in FIG. 8).

At block 904, operations 900 continue with the UE transmitting, to a serving base station (BS) and in response to receiving the SI, an indication that the UE has completed SI acquisition. Continuing the example from above, UE 120 transmits, to BS 110*a* and in response to receiving the SI in block 902, an indication that UE 120 has completed SI acquisition.

Figure 10:
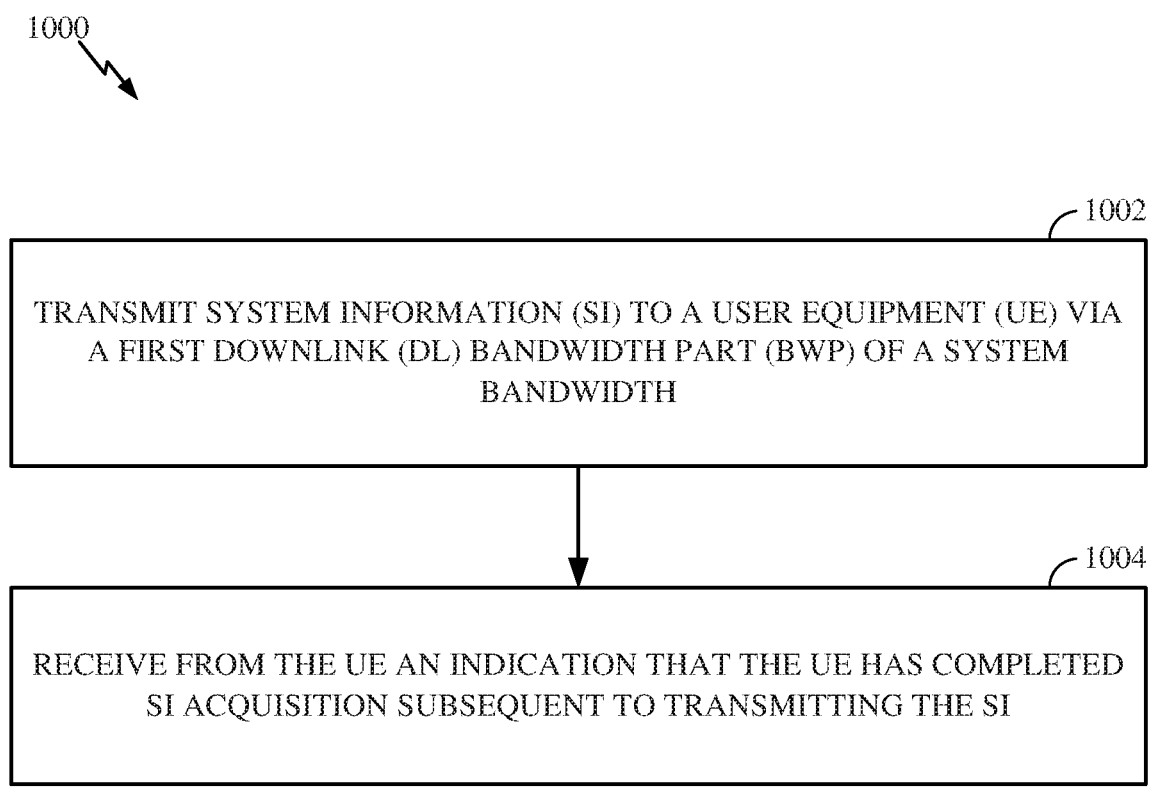
FIG. 10 illustrates example operations for wireless communications performed by a base station, in accordance with certain aspects of the present disclosure.

FIG. 10 illustrates example operations 1000 for wireless communications, in accordance with aspects of the present disclosure. Operations 1000 may be performed, for example, by a base station (e.g., a gNB), such as BS 110*a* shown in FIG. 1. Operations 1000 may be considered complementary to operations 900, shown in FIG. 9.

Operations 1000 begin, at block 1002, with the base station transmitting system information (SI) to a user equipment (UE) via a first downlink (DL) bandwidth part (BWP) of a system bandwidth. For example, BS 110*a* transmits SI to UE 120 via a first DL BWP (e.g., BWP 802, shown in FIG. 8) of a system bandwidth (e.g., bandwidth 800, shown in FIG. 8).

At block 1004, operations 1000 continue with the base station receiving from the UE an indication that the UE has completed SI acquisition subsequent to transmitting the SI.

Continuing the example from above, BS 110*a* receives an indication from UE 120 that UE 120 has completed SI acquisition subsequent to BS 110*a* transmitting the SI (i.e., the SI in block 1002).

According to aspects of the present disclosure, a network (e.g., a base station of the network) may send SI on one or more configured DL BWPs (e.g., DL BWPs configured for UEs served by the BS). The network (e.g., a base station of the network) may identify a currently active DL BWP of a UE. After identifying the currently active DL BWP of the UE, the network may transmit a command via a downlink control information (DCI) to cause a UE to switch from the currently active BWP to a BWP conveying updated SI when the network updates the SI. The UE may start acquiring remaining minimum system information (RMSI) and other SIs from the next SI modification boundary in response to receiving the command.

In aspects of the present disclosure, for non-public warning system (non-PWS) system information acquisition, a gap between a broadcast control channel (BCCH) modification notification and a next modification period may be long enough for the network to perform a BWP switch (e.g., transmit a command to switch BWPs to each served UE) for SI acquisition by served UEs.

According to previously known techniques and as mentioned above, the network does not know when a UE has finished acquiring all necessary SIs. Correspondingly, the network does not know when the network can indicate to the UE to switch back to the BWP that was active for the UE before the UE switched BWPs to receive updated SI.

In aspects of the present disclosure, a UE may send an SI acquisition completion indication to the network after the UE has finished acquiring all necessary SIs, as described above with reference to block 904 in FIG. 9.

According to aspects of the present disclosure, an SI acquisition completion indication may be sent by a UE via either radio resource control (RRC) signaling or via a medium access control (MAC) control element (CE).

In aspects of the present disclosure, the network may refrain from commanding a UE to switch BWPs after sending updated system information (e.g., as in block 1002 of FIG. 10) and before receiving a SI acquisition completion indication from the UE (e.g., as in block 1004 of FIG. 10). Thus, the network may transmit unicast data to the UE via the BWP where the UE acquires the updated SI, instead of in the previously active DL BWP for the UE.

According to aspects of the present disclosure, the network may include in a command to a UE to switch BWPs a request for the UE to transmit an indication that the UE has completed SI acquisition, once the UE has completed S acquisition.

In aspects of the present disclosure, a BS may obtain data other than SI for transmission to a UE, and the BS may transmit the data to the UE via a second DL BWP subsequent to receiving the indication from the UE that the UE has completed SI acquisition, as described above with reference to block 1004 of FIG. 10.

Figure 11:
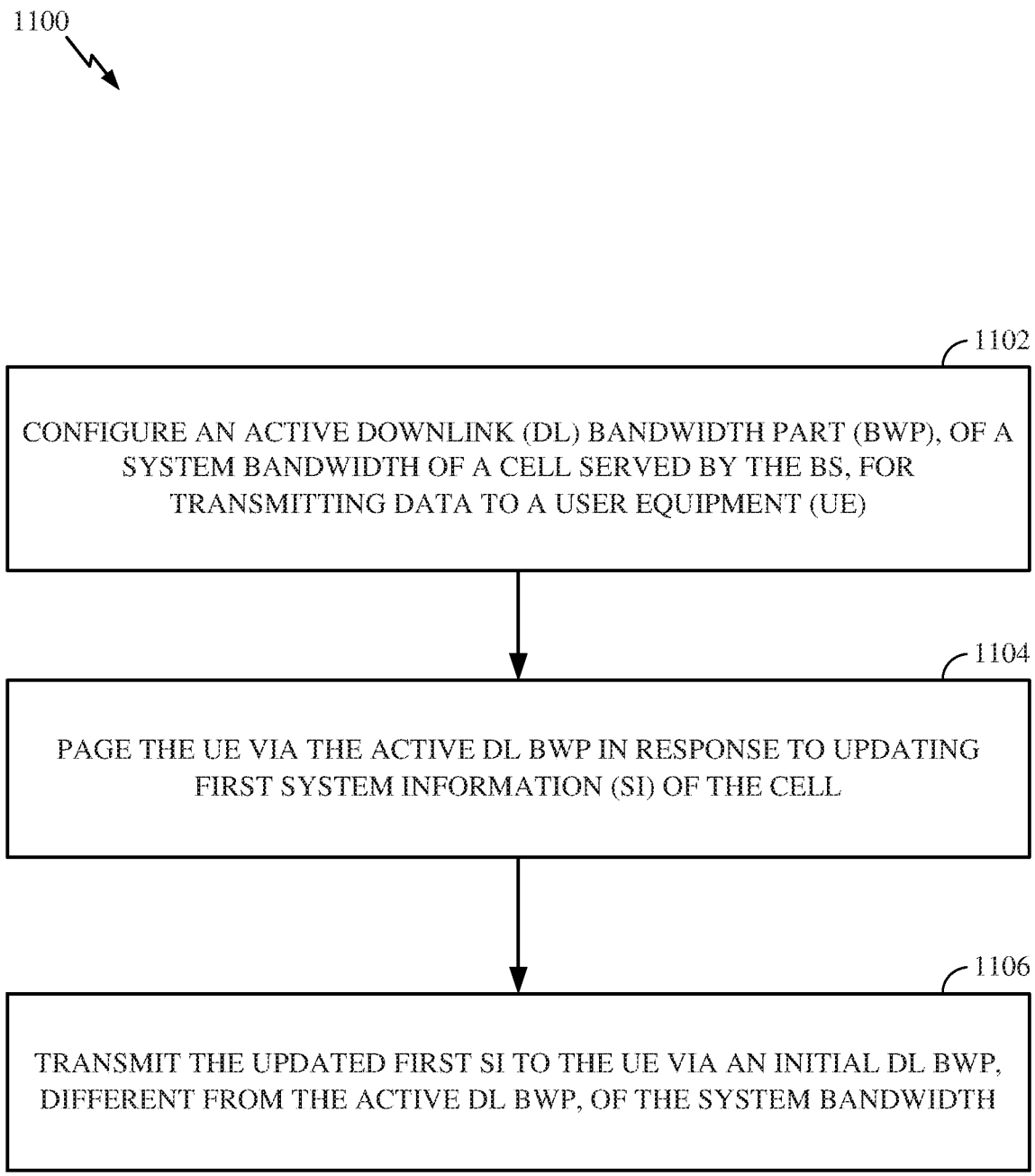
FIG. 11 illustrates example operations for wireless communications performed by a base station, in accordance with certain aspects of the present disclosure.

FIG. 11 illustrates example operations 1100 for wireless communications, in accordance with aspects of the present disclosure. Operations 1100 may be performed, for example, by a base station (e.g., a gNB), such as BS 110*a* shown in FIG. 1.

Operations 1100 begin, at block 1102, with the base station configuring an active downlink (DL) bandwidth part (BWP), of a system bandwidth of a cell served by the BS, for transmitting data to a user equipment (UE). For example, BS 110*a* configures an active DL BWP (e.g., BWP 804, shown in FIG. 8), of a system bandwidth (e.g., bandwidth 800, shown in FIG. 8) of a cell (e.g., cell 102*a*, shown in FIG. 1) served by BS 110*a*, for transmitting data to UE 120.

At block 1104, operations 1100 continue with the base station paging the UE via the active DL BWP in response to updating first system information (SI) of the cell. Continuing the example from above, BS 110*a* pages UE 120 via the active DL BWP (i.e., the active DL BWP configured by the BS in block 1102) in response to updating first SI of the cell.

At block 1106, operations 1100 continue with the base station transmitting the updated first SI to the UE via another DL BWP, different from the active DL BWP, of the system bandwidth. Continuing the example from above, BS 110*a* transmits the updated first SI (i.e., the SI mentioned in block 1104) to UE 120 via another DL BWP (e.g., BWP 802, shown in FIG. 8), different from the active DL BWP (i.e., the active DL BWP configured by the BS in block 1102), of the system bandwidth.

Figure 12:
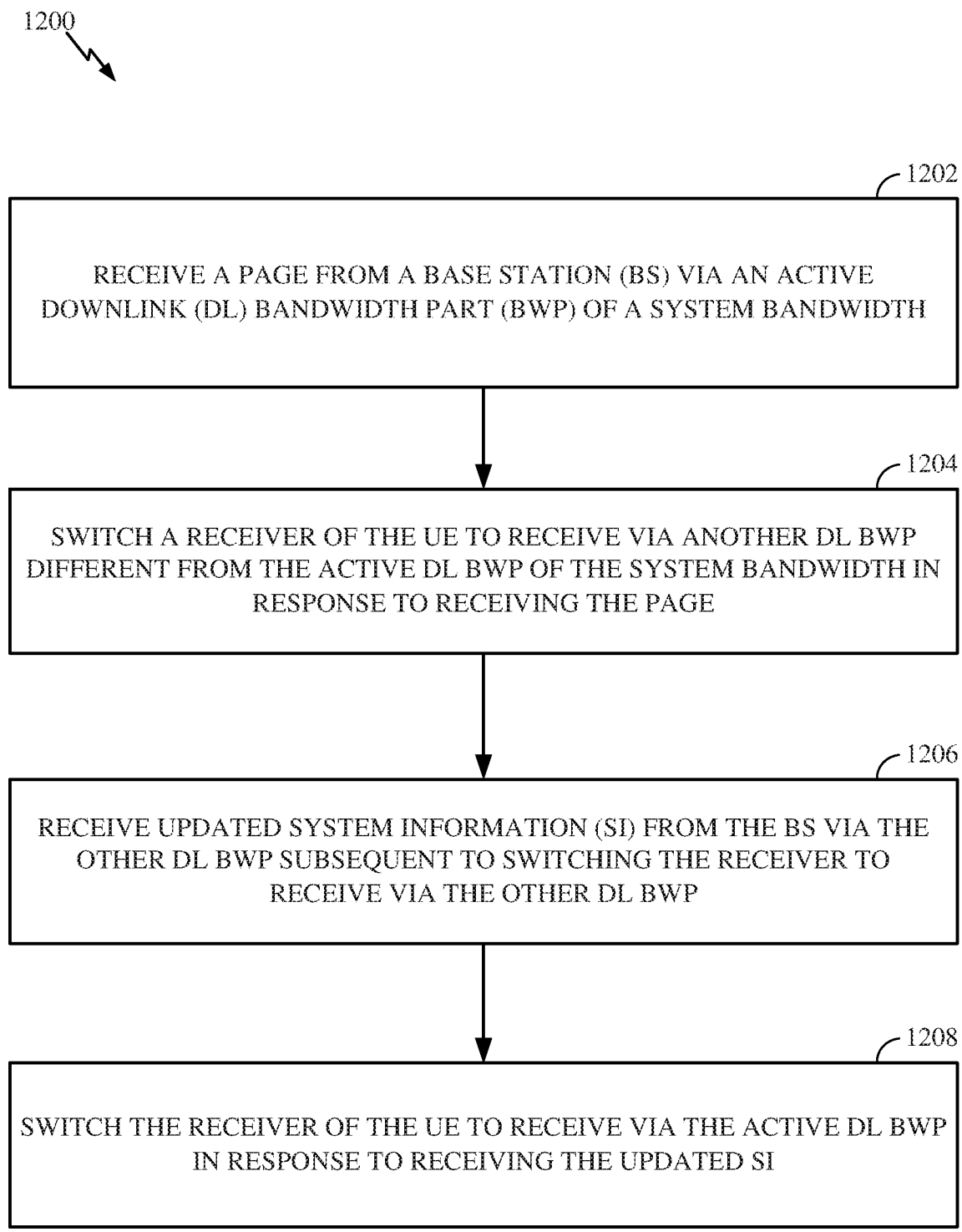
FIG. 12 illustrates example operations for wireless communications performed by a user equipment, in accordance with certain aspects of the present disclosure.

FIG. 12 illustrates example operations 1200 for wireless communications, in accordance with aspects of the present disclosure. Operations 1200 may be performed, for example, by a UE, such as UE 120 shown in FIG. 1. Operations 1200 may be considered complementary to operations 1100, shown in FIG. 11.

Operations 1200 begin, at block 1202, with the UE receiving a page from a base station (BS) via an active downlink (DL) bandwidth part (BWP) of a system bandwidth. For example, UE 120 (shown in FIG. 1) receives a page from BS 110*a* via an active DL BWP (e.g., BWP 804, shown in FIG. 8), of a system bandwidth (e.g., bandwidth 800, shown in FIG. 8).

At block 1204, operations 1200 continue with the UE switching a receiver of the UE to receive via another DL BWP different from the active DL BWP of the system bandwidth in response to receiving the page. Continuing the example from above, UE 120 switches a receiver of the UE to receive via another DL BWP (e.g., BWP 802, shown in FIG. 8) different from the active DL BWP of the system bandwidth (i.e., the system bandwidth mentioned in block 1202) in response to receiving the page (i.e., the page received in block 1202).

At block 1206, operations 1200 continue with the UE receiving updated system information (SI) from the BS via the other DL BWP subsequent to switching the receiver to receive via the other DL BWP. Continuing the example from above, UE 120 receives updated SI from BS 110*a* via the other DL BWP (i.e., the other DL BWP, different from the active DL BWP, to which the UE switched the receiver in block 1204) subsequent to switching the receiver (i.e., in block 1204) to receive via the other DL BWP.

Operations 1200 continue at block 1208 with the UE switching the receiver of the UE to receive via the active DL BWP in response to receiving the updated SI. Continuing the example from above. UE 120 switches the receiver (i.e., the receiver switched to receive via the other DL BWP in block 1204) of UE 120 to receive via the active DL BWP (i.e., the active DL BWP mentioned in block 1202) in response to receiving the updated SI (i.e., in block 1206).

According to aspects of the present disclosure, a network (e.g., a base station of the network) may send SI (e.g., updated SI) only on an initial DL BWP for a UE (or may only send normal, non-PWS SI on the initial DL BWP). When a UE first camps on a cell, the DL BWP from which the UE receives initial transmissions from a BS serving the cell may be referred to as an initial DL BWP for the UE.

In aspects of the present disclosure, the network (e.g., a base station of the network) may configure an initial DL BWP as one of the configured BWP for a UE. The network may then transmit a DCI (e.g., a command in a DCI) to indicate to the UE to switch BWPs from the current active BWP to the initial BWP in order for the UE to receive SI (e.g., updated SI) via the initial BWP. In this case, it may be desirable for the initial BWP to have the same numerology as all of other configured BWPs for the cell, so that if a UE that only supports one numerology joins the cell, that UE will be enabled to receive the SI. Thus, in one embodiment, the initial DWP and the active BWP are configured with the same numerology.

According to aspects of the present disclosure, a UE may send an SI acquisition completion indication (e.g., as in block 904 of FIG. 9) to the network after the UE has finished acquiring all necessary SIs via the initial BWP. In at least one embodiment, the UE only sends the SI acquisition completion indication if configured or requested to do so by the network or base station (e.g., a gNB or eNB).

In aspects of the present disclosure, an SI acquisition completion indication may be sent by a UE via either radio resource control (RRC) signaling or via a medium access control (MAC) control element (CE) or L1 signaling which may include a scheduling request (SR) or a PUSCH in preconfigured resources.

According to aspects of the present disclosure, a network (e.g., a base station of the network) may not configure an initial DL BWP as one of the configured BWPs for a UE. The network may then page the UE on the active DL BWP of the UE (e.g., as in block 1104 of FIG. 11) when the network updates system information. The UE may then autonomously switch a receiver of the UE to the initial DL BWP (e.g., as in block 1204 of FIG. 12) in order to receive SI via the initial DL BWP (e.g., as in block 1206 of FIG. 12). The UE may then switch back to a previous active BWP (e.g., as in block 1208 of FIG. 12) after the UE has finished acquiring the SI.

In aspects of the present disclosure, a network (e.g., a base station of the network) may configure a system information gap period for a UE. This SI gap period is a period between a time when the network sends an SI update notification (e.g., a page as in block 1104 of FIG. 11) and a time when the UE switches back to a previous active BWP after the UE has acquired SI in an initial BWP. During this gap (which may be referred to as a retuning gap or an SI gap), a BS (e.g., a gNB) may refrain from scheduling data transmission and/or reception for the UE. The UE may retune a receiver of the UE from one BWP to another BWP (e.g., as in blocks 1204 and 1208 in FIG. 12) during the SI gap period.

According to aspects of the present disclosure, an SI gap may be cell-specific. That is, each cell in a network may configure a different SI gap than every other cell in the network. Each cell in the network may independently determine if the cell should configure an SI gap.

In aspects of the present disclosure, an SI gap may be UE-specific. That is, a base station may configure a different SI gap for each UE served by the base station. A base station may determine a duration of a UE-specific SI gap based on varying channel conditions of the UE.

According to aspects of the present disclosure, as part of configuring an SI gap period for a UE, a base station may determine a duration of the SI gap period and then signal the duration of the SI gap period to the UE.

According to aspects of the present disclosure, for PWS system information (e.g., while transmitting an ETWS alert and/or a CMAS alert) acquisition, a BWP switch may not be allowed, because it is desirable to deliver the PWS notification to a UE as quickly as possible.

In aspects of the present disclosure, when a base station obtains an indication to transmit a PWS alert (e.g., a PWS notification) to a UE, the BS may transmit SI to the UE via an active DL BWP and not via another DL BWP (e.g., an initial DL BWP, as in block 1106 of FIG. 11).

According to aspects of the present disclosure, a UE may receive (e.g., as part of a page) an indication that a serving BS will transmit public warning system (PWS) SI via an initial DL BWP. The UE may then autonomously switch a receiver of the UE to receive the SI via the initial DL BWP and, upon receiving the SI, the UE may autonomously switch the receiver of the UE to receive via the active DL BWP.

Figure 13:
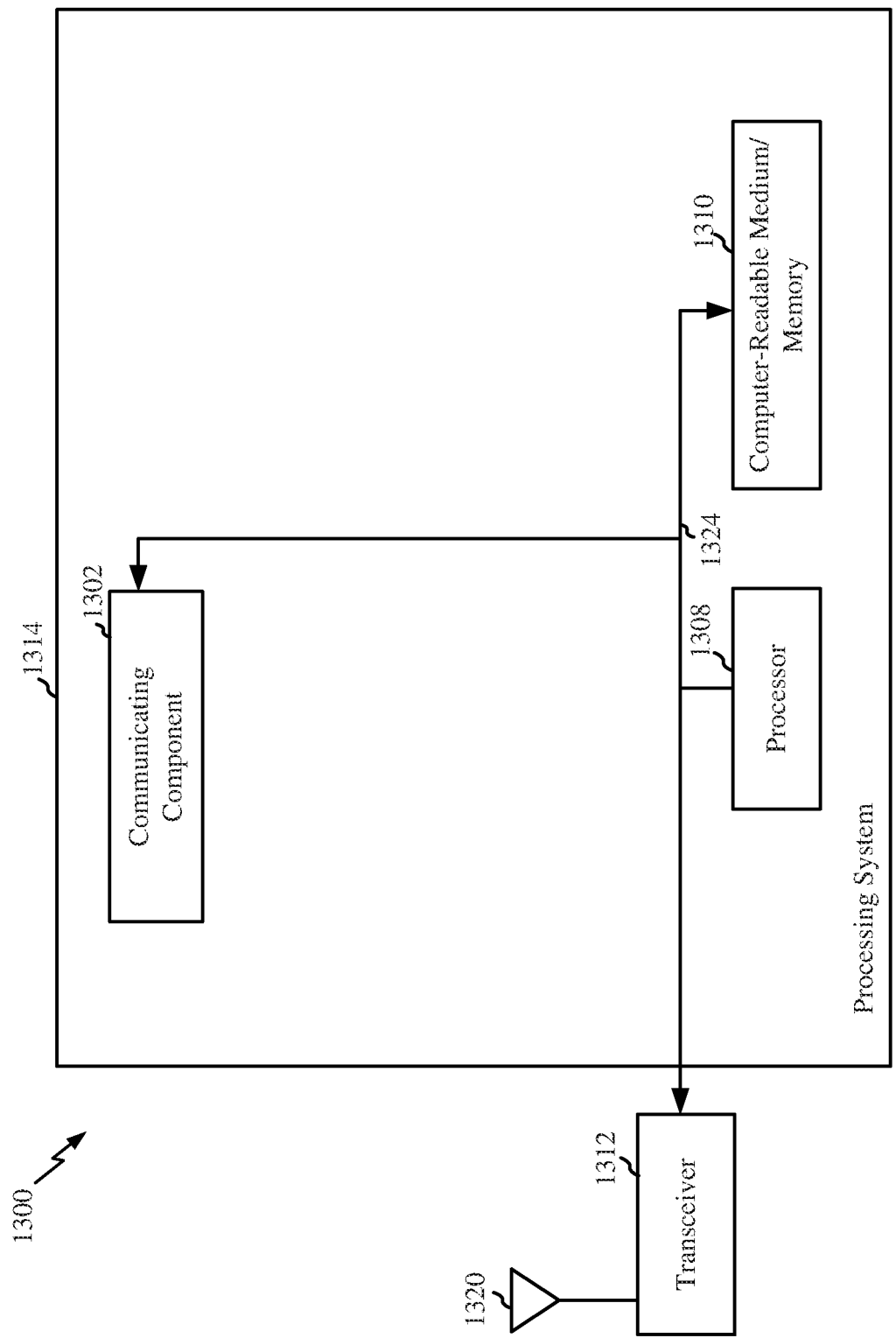
FIG. 13 illustrates a communications device that may include various components configured to perform operations for the techniques disclosed herein, in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIGS. 9-12. The communications device 1300 includes a processing system 1314 coupled to a transceiver 1312. The transceiver 1312 is configured to transmit and receive signals for the communications device 1300 via an antenna 1320, such as the various signals described herein. The processing system 1314 may be configured to perform processing functions for the communications device 1300, including processing signals received and/or to be transmitted by the communications device 1300.

The processing system 1314 includes a processor 1308 coupled to a computer-readable medium/memory 1310 via a bus 1224. In certain aspects, the computer-readable medium/memory 1310 is configured to store instructions that when executed by processor 1308, cause the processor 1308 to perform or direct the apparatus to perform the operations illustrated in FIGS. 9-12, or other operations for performing the various techniques discussed herein.

In certain aspects, the processing system 1314 further includes a communicating component 1302 for performing the operations illustrated at 902 and 904 in FIG. 9, at 1002 and 1004 in FIG. 10, at 1104 and 1106 in FIG. 11, and/or at 1202 and 1206 in FIG. 12. The communicating component 1302 may be coupled to the processor 1308 via bus 1324. In certain aspects, the communicating component 1302 may be hardware circuits. In certain aspects, the communicating component 1302 may be software components that are executed and run on processor 1308.

Figure 14:
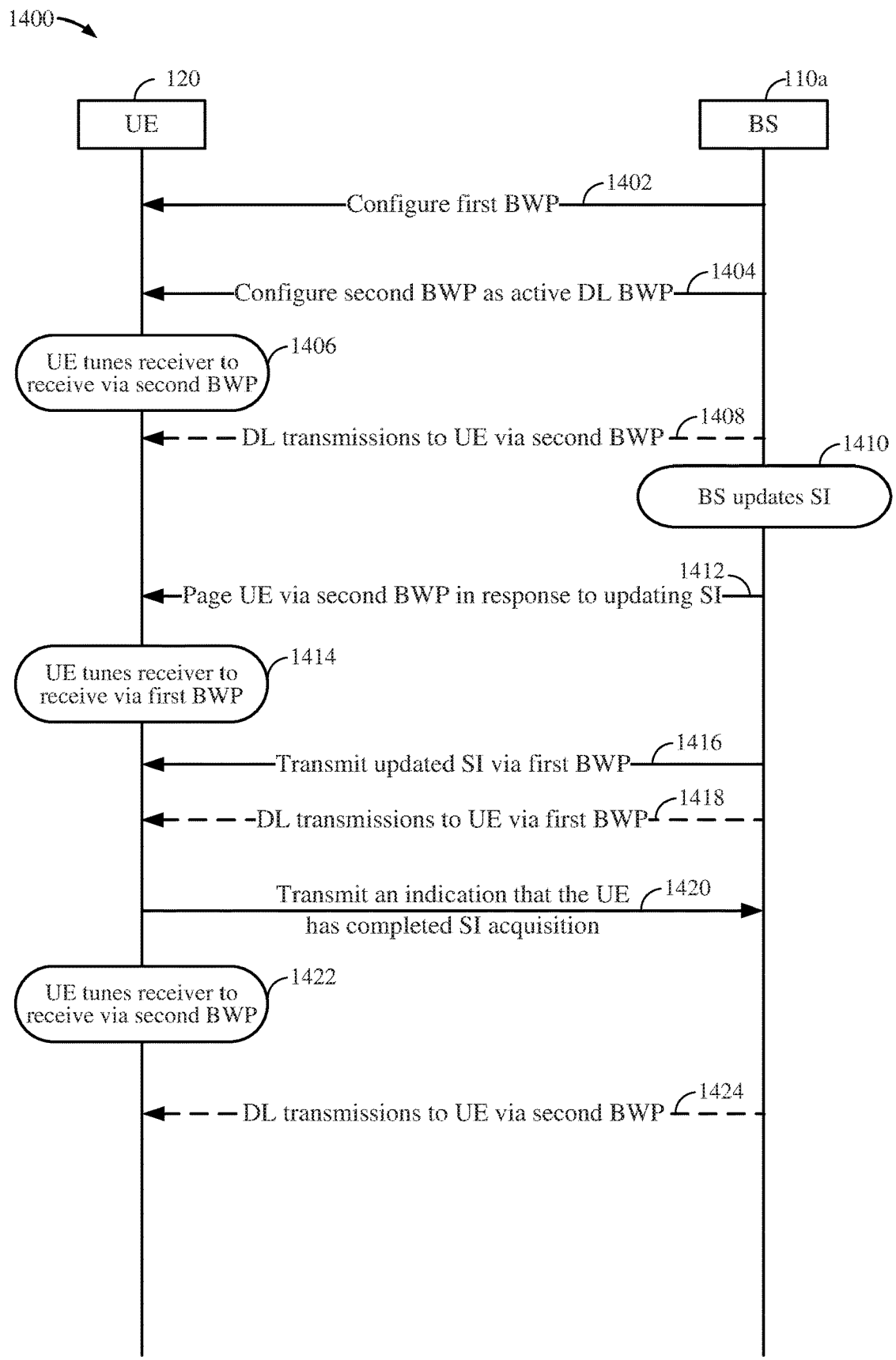
FIG. 14 is an exemplary call flow of a UE and a BS operating in accordance with certain aspects of the present disclosure.

FIG. 14 is an exemplary call flow 1400 of a UE 120 (see FIG. 1) and BS 110*a* (see FIG. 1) operating in accordance with certain aspects of the present disclosure. The exemplary call flow begins at 1402 with the UE receiving a configuration of a first BWP (e.g., BWP4, shown in FIG. 8) as a DL BWP from the BS. At 1404, the UE receives a configuration of a second BWP (e.g., BWP1, shown in FIG. 8) as the active DL BWP for the UE. While the exemplary call flow shows the UE receiving the configuration of the first BWP before the configuration of the second BWP, the present disclosure is not so limited, and a UE may receive the configuration of the second BWP as the active DL BWP before receiving the configuration of the first BWP, or receive a single configuration configuring the first BWP as a DL BWP and the second BWP as the active DL BWP. At 1406, the UE tunes a receiver to receive via the second BWP. At 1408, the BS may optionally transmit DL transmissions (e.g., PDSCH) to the UE via the second BWP. The BS updates system information (SI) at 1410. At 1412, the BS pages the UE via the second BWP in response to the BS updating the SI at 1410. At 1414, the UE tunes the receiver to receive via the first BWP. The BS transmits the updated SI to the UE via the first BWP at 1416. The BS may optionally transmit DL transmissions to the UE via the first BWP at 1418, before the UE transmits an indication that the UE has completed SI acquisition at 1420. At 1422, the UE tunes the receiver to receive via the second BWP again. In at least one embodiment, the UE tunes the receiver to receive via the second BWP before transmitting an indication that the UE has completed SI acquisition. The BS may optionally transmit DL transmissions to the UE via the second BWP at 1424.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure) ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting, means for sending, means for configuring, means for paging and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for generating, means for multiplexing, means for determining, means for obtaining, means for duplicating, and/or means for applying may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, the instructions may include instructions for performing the operations described herein and illustrated in FIGS. 9-10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communications performed by a user equipment (UE), comprising:
   receiving a first command in a first downlink control information (DCI) to switch to a first downlink (DL) bandwidth part (BWP) of a system bandwidth, wherein the first DCI comprises a request to the UE to transmit, subsequent to the UE receiving system information (SI), an indication that the UE has completed SI acquisition;
   receiving the SI via a transmission in the first DL BWP;
   transmitting, to a serving base station (BS) and in response to receiving the SI, the indication that the UE has completed SI acquisition;
   receiving a second command in a second DCI to switch to a second DL BWP subsequent to receiving the SI; and
   switching a receiver of the UE to receive via the second DL BWP in response to receiving the second command.

2. The method of claim 1, wherein transmitting the indication comprises transmitting the indication via a medium access control (MAC) control element (CE).

3. The method of claim 1, wherein transmitting the indication comprises transmitting the indication via radio resource control (RRC) signaling.

4. The method of claim 1, wherein transmitting the indication comprises transmitting the indication via layer one (L1) signaling.

5. The method of claim 4, wherein the L1 signaling comprises a scheduling request (SR) or a physical uplink shared channel (PUSCH) in preconfigured resources.

6. The method of claim 1, further comprising:
   determining to transmit the indication that the UE has completed the SI acquisition, based on the request.

7. A method of wireless communications performed by a base station (BS), comprising:
   transmitting a first command in a first downlink control information (DCI) for a user equipment (UE) to switch to a first downlink (DL) bandwidth part (BWP) of a system bandwidth, wherein the first DCI comprises a request to the UE to transmit, subsequent to the UE receiving system information (SI), an indication that the UE has completed SI acquisition;
   transmitting the SI to the UE via the first DL BWP; and
   receiving from the UE the indication that the UE has completed SI acquisition subsequent to transmitting the SI; and
   transmitting a second command in a second DCI for the UE to switch to a second DL BWP subsequent to receiving the SI.

8. The method of claim 7, further comprising:
identifying a current DL BWP of the UE prior to transmitting the SI; and
transmitting the first command, in the first DCI via the current DL BWP prior to transmitting the SI.

9. The method of claim 7, further comprising:
determining the first DL BWP is a currently configured DL BWP for the UE, prior to transmitting the SI.

10. The method of claim 7, further comprising:
obtaining, subsequent to transmitting the SI, data other than the SI for transmission to the UE prior to receiving the indication;
determining, based on not receiving the indication, to transmit the data via the first DL BWP; and
transmitting the data to the UE via the first DL BWP and prior to receiving the indication from the UE.

11. The method of claim 7, further comprising:
obtaining data other than the SI for transmission to the UE; and
transmitting the data to the UE via a second DL BWP subsequent to receiving the indication from the UE.

12. The method of claim 7, wherein receiving the indication comprises receiving the indication via a medium access control (MAC) control element (CE).

13. The method of claim 7, wherein receiving the indication comprises receiving the indication via radio resource control (RRC) signaling.

14. A method of wireless communications performed by a user equipment (UE), comprising:
receiving a page from a base station (BS) via an active downlink (DL) bandwidth part (BWP) of a system bandwidth;
switching a receiver of the UE to receive via another DL BWP different from the active DL BWP of the system bandwidth in response to receiving the page;
receiving updated system information (SI) from the BS via the other DL BWP subsequent to switching the receiver to receive via the other DL BWP; and
switching the receiver of the UE to receive via the active DL BWP in response to receiving the updated SI.

15. The method of claim 14, further comprising:
receiving public warning system (PWS) SI via one of the active DL BWP or the other DL BWP.

16. The method of claim 14, further comprising:
receiving data other than the updated SI via the active DL BWP subsequent to switching the receiver of the UE to receive via the active DL BWP.

17. An apparatus for wireless communications, comprising:
a processor configured to:
receive a first command in a first downlink control information (DCI) to switch to a first downlink (DL) bandwidth part (BWP) of a system bandwidth, wherein the first DCI comprises a request to the apparatus to transmit, subsequent to the apparatus receiving system information (SI), an indication that the apparatus has completed SI acquisition
receive the SI via a transmission in the first DL BWP;
transmit, to a serving base station (BS) and in response to receiving the SI, the indication that the apparatus has completed SI acquisition;
receive a second command in a second DCI to switch to a second DL BWP subsequent to receiving the SI; and
switch a receiver of the apparatus to receive via the second DL BWP in response to receiving the second command; and
a memory coupled with the processor.

18. The apparatus of claim 17, wherein the processor is configured to transmit the indication via a medium access control (MAC) control element (CE).

19. The apparatus of claim 17, wherein the processor is configured to transmit the indication via radio resource control (RRC) signaling.

20. The apparatus of claim 17, wherein the processor is configured to transmit the indication via layer one (L1) signaling.

21. The apparatus of claim 20, wherein the L1 signaling comprises a scheduling request (SR) or a physical uplink shared channel (PUSCH) in preconfigured resources.

22. The apparatus of claim 17, wherein the processor is configured to:
determine to transmit the indication that the apparatus has completed the SI acquisition, based on the request.

* * * * *